(12) United States Patent
Shinohara et al.

(10) Patent No.: US 7,301,709 B2
(45) Date of Patent: Nov. 27, 2007

(54) IMAGING OPTICAL SYSTEM WITH FOCUSING FUNCTION

(75) Inventors: Yoshikazu Shinohara, Saitama (JP); Kenichi Sato, Saitama (JP)

(73) Assignee: Fujinon Corporation, Saitama (JP)

( * ) Notice: Subject to any disclaimer, the term of this patent is extended or adjusted under 35 U.S.C. 154(b) by 9 days.

(21) Appl. No.: 11/261,617

(22) Filed: Oct. 31, 2005

(65) Prior Publication Data

US 2006/0103947 A1    May 18, 2006

(30) Foreign Application Priority Data

Nov. 1, 2004   (JP)   ............ P.2004-318349

(51) Int. Cl.
   *G02B 1/06*   (2006.01)
   *G02B 3/12*   (2006.01)
(52) U.S. Cl. ..................... 359/665; 359/796
(58) Field of Classification Search ........ 359/665–667, 359/796
   See application file for complete search history.

(56) References Cited

U.S. PATENT DOCUMENTS 6,344,930 B1 *   2/2002   Kaneko et al. ............. 359/666

2005/0200973 A1 *   9/2005   Kogo et al. ................. 359/689
2006/0056042 A1 *   3/2006   Kim et al. .................. 359/666

OTHER PUBLICATIONS

Philips Research Press Release, "Philips' Fluid Lenses Bring Things into Focus", Mar. 3, 2004, on the Internet URL:http://www.research. philips.com/newscenter/archive/2004/fluidfocus.html).

* cited by examiner

*Primary Examiner*—Jordan M. Schwartz
(74) *Attorney, Agent, or Firm*—Birch, Stewart, Kolasch & Birch, LLP

(57) ABSTRACT

An imaging optical system is provided and has a focusing section including a cemented lens (first and second lenses), which includes first and second fluid materials having different refractive indices from each other; and whose cemented surface shape can be electrically controlled. A refractive index Nd1 of the first fluid material, a refractive index Nd2 of the second fluid material, a minimum value RA of a radius of curvature of the cemented surface of the cemented lens, a focal length fa of the whole cemented lens, and a focal length f of the whole lens system satisfy the conditions specified in the specification.

1 Claim, 5 Drawing Sheets

FIG. 3A

| | Si | Ri | Di | Ndj | υdj |
|---|---|---|---|---|---|
| | \multicolumn{5}{c|}{BASIC LENS DATA} | | | | |

| | Si | Ri | Di | Ndj | υdj |
|---|----|----|----|-----|-----|
| 10 { | 1 | 16.0802 | 0.80 | 1.78000 | 23.8 |
| | 2 | 30.0(RA)~∞ | 0.80 | 1.91000 | 23.8 |
| | 3 | -16.0802 | 1.55 | | |
| 20 { | 4 | -3.4412 | 0.50 | 1.84666 | 23.8 |
| | 5 | 7.1350 | 3.90 | 1.81600 | 46.6 |
| | 6 | -3.8981 | 0.20 | | |
| | *7 | 3.6950 | 1.50 | 1.50869 | 56.0 |
| | *8 | 3.9450 | 4.10 | | |
| | 9 | ∞ | 1.00 | 1.51680 | 64.2 |
| | 10 | ∞ | | | |

(*: ASPHERICAL SURFACE)

FIG. 3B

| ASPHERICAL SURFACE DATA | | |
|---|---|---|
| ASPHERICAL SURFACE COEFFICIENT | SURFACE NUMBER | |
| | 7TH SURFACE | 8TH SURFACE |
| KA | -11.9807 | -21.1116 |
| $A_3$ | 1.4925E-02 | 3.4566E-02 |
| $A_4$ | 1.3683E-02 | -7.0123E-04 |
| $A_5$ | -2.4304E-03 | 7.9010E-03 |
| $A_6$ | -1.0581E-03 | -3.6384E-03 |
| $A_7$ | -1.0266E-03 | -4.8320E-03 |
| $A_8$ | 5.3558E-04 | 3.6477E-03 |
| $A_9$ | -2.5798E-05 | -9.1128E-04 |
| $A_{10}$ | -1.1768E-05 | 7.9688E-05 |

FIG. 4A

| OBJECT DISTANCE | OTHER DATA | | | |
|---|---|---|---|---|
| | R2 | f | FNO. | 2ω |
| LONG DISTANCE (∞) | ∞ | 6.21 | 4.8 | 56.9° |
| SHORT DISTANCE (240mm) | 30.0mm | 6.24 | 4.8 | 56.8° |

FIG. 4B

| VALUES CONCERNING CONDITIONAL EXPRESSIONS | | |
|---|---|---|
| (1) $\|Nd1-Nd2\|$ | (2) $\|RA\|/f$ | (3) $\|fa/f\|$ |
| 0.13 | 4.85 | 1.57 (R2=∞) |
| | | 1.52 (R2=30.0) |

FNO.=4.80
G LINE
D LINE
C LINE
-0.1mm  0.1mm
SPHERICAL
ABERRATION

ω=28.4°
SAGITAL
TANGENTIAL
-0.1mm  0.1mm
ASTIGMATISM

ω=28.4°
-5%  5%
DISTORTION

FNO.=4.80
G LINE
D LINE
C LINE
-0.1mm  0.1mm
SPHERICAL
ABERRATION

ω=28.5°
SAGITAL
TANGENTIAL
-0.1mm  0.1mm
ASTIGMATISM

ω=28.5°
-5%  5%
DISTORTION

IMAGING OPTICAL SYSTEM WITH FOCUSING FUNCTION

FIELD OF THE INVENTION

The present invention relates to an imaging optical system with a focus function which is used for focusing technology in various cameras, cellular phones with a camera, and the like.

BACKGROUND OF THE INVENTION

Cameras and camcorders with an autofocus function have been known. In these imaging apparatuses, focusing is generally performed by moving the whole or a part of a lens system of an imaging lens using a drive systems such as a motor or the like. On the other hand, in recent years, a number of small-size information terminal apparatuses, such as a cellular phone, a personal digital assistant (PDA), and the like, which includes an imaging module to have an imaging function, are becoming available on the market. Imaging optical systems in these information terminal apparatuses often employ pan focus, in which the depth of field of a lens is utilized, as a focusing method in favor of ease of miniaturization and configuration.

Recently, a fluid lens system in which the focal length can be changed without moving parts has been developed (Philips Research Press Release, "Philips' Fluid Lenses Bring Things into Focus", Mar. 3, 2004, on the Internet <URL: http://www.researchphilips.com/newscenter/archive/2004/fulidfocus.html>). This system is composed of two immiscible fluids (lens materials) of different refractive indices, which are loaded in a cylindrical tube and whose shapes are electrically controlled.

As described above, in recent years, it is often that small-size information terminal apparatuses have an imaging function and employs pan focus as a focusing method. However, in such apparatuses, a demand for image quality is growing year after year. Also, a demand is being shifted from the pan focus optical system to an autofocus optical system. However, autofocus in the related art is performed by moving an imaging lens using a drive system such as a motor or the like. Therefore, a lens moving mechanism is required, which is disadvantageous in terms of ease of miniaturization and configuration.

SUMMARY OF THE INVENTION

An object of an illustrative, non-limiting embodiment of the invention is to solve the above-described problems and to provide an imaging system with a focus function, which can efficiently perform focusing without mechanically moving a lens and is suitable for miniaturization. Also, the invention is not required to solve the above-described problems, and an illustrative, non-limiting embodiment of the invention may solve a different problem or may not solve any problems.

The fluid lens as described in the above Philips Research Press Release can change a focal length without mechanically moving the lens using a motor or the like. If such a lens system can be applied to focusing technology, it is advantageous in terms of ease of miniaturization and configuration.

An exemplary embodiment of an imaging optical system with a focus function according to the present invention includes: a lens group remaining fixed during focusing; a focusing cemented lens (or a focusing compound lens) including a first fluid material and a second fluid material as lens materials in this order from an object, the first and second fluid materials having different refractive indices, and a shape of an interface (sometimes in this specification, referred to as "a cemented surface") between the first and second fluid materials being variable; and control means for electrically controlling the shape of the interface between the first and second materials, depending on a distance from the object. The focusing cemented lens has a power as a whole and satisfies the following conditions over an entire focusing region:

$$0.1 < |Nd1 - Nd2| < 0.5 \quad (1)$$

$$3 < |RA|/f < 20 \quad (2)$$

$$|fa/f| > 1.0 \quad (3)$$

where Nd1 indicates a refractive index to a d line of the first fluid material of the cemented lens, Nd2 indicates a refractive index to a d line of the second fluid material of the cemented lens, RA indicates a minimum value in use of a curvature radius of the interface between the first and second fluid materials, fa indicates a focal length of the cemented lens, and f indicates a focal length of the whole lens system (including the lens group and the focusing cemented lens).

An imaging optical system with a focus function of the present invention has a power as a whole and performs focusing using a focusing cemented lens whose cemented surface has a variable shape. The cemented surface shape of the focusing cemented lens is electrically controlled. Focusing is achieved by controlling the cemented surface shape, depending on a distance from an object. Since focusing is performed without mechanically moving a lens using a motor or the like, it is advantageous in terms of ease of miniaturization and configuration. In this case, the focusing cemented lens is advantageous in terms of efficient focusing and manufacture when the conditions represented by expressions (1) to (3) are satisfied over the entire focus region.

BRIEF DESCRIPTION OF DRAWINGS

FIGS. 3A and 3B are diagrams illustrating a specific numerical value example of an imaging optical system.

FIGS. 4A and 4B are diagrams illustrating other numerical value data.

DETAILED DESCRIPTION OF THE INVENTION

Hereinafter, exemplary embodiments of the present invention will be described in detail with reference to the accompanying drawings.

Figure 1:
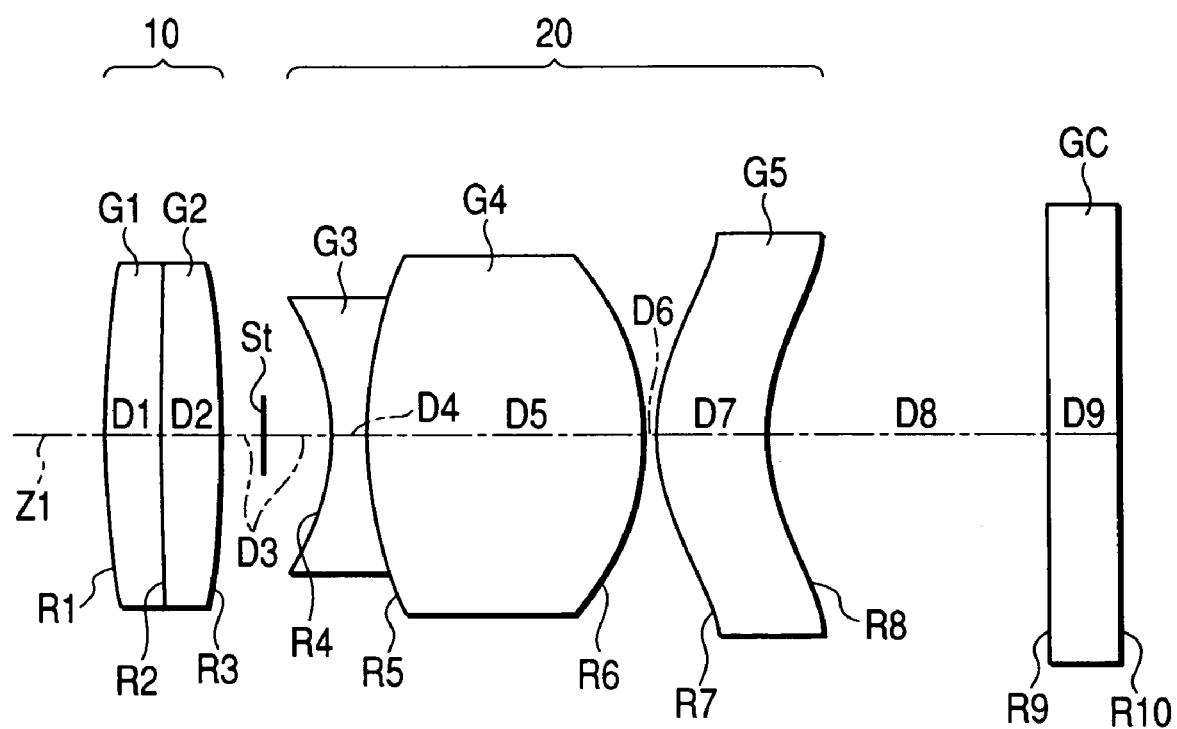
FIG. 1 is a lens cross-sectional view of an exemplary structure of an imaging optical system according to an illustrative, non-limiting embodiment of the present invention.

FIG. 1 illustrates an exemplary structure of an imaging optical system according to an exemplary embodiment of the present invention. This structure corresponds to a lens structure of a numerical value example (FIGS. 3A and 3B)

described below. Note that, in FIG. 1, reference character Ri indicates a radius of curvature of an i-th (i=1 to 10) component surface, where a component surface closest to an object is the first component surface, and i is successively increased toward an image. Reference character Di indicates a surface interval on an optical axis Z1 between the i-th surface and the i+1-th surface.

The imaging optical system is incorporated into a small-size information terminal apparatus (e.g., a cellular phone with a camera, etc.), a digital camera, or the like, and is used therein. The imaging optical system includes a focusing section 10, and a lens group 20 which remains fixed during focusing. The focusing section 10 and the lens group 20 are arranged along the optical axis Z1 in this order from an object. An imaging device (not shown), such as a Charge Coupled Device (CCD), a Complementary Metal Oxide Semiconductor (CMOS), or the like, is provided on an imaging capturing surface (imaging surface) of the imaging optical system. A cover glass GC for protecting the imaging surface is provided near the imaging surface of the imaging device. Another optical member, such as an infrared cut filter, a lowpass filter, or the like, may be provided in addition to the cover glass GC between the fixed lens group 20 and the image capturing surface (imaging surface). The focusing section 10 may be fixedly provided inside a lens barrel, or alternatively, may be constructed as a focusing attachment which is detachable with respect to the fixed lens group 20. The focusing section 10 has a cemented lens (a compound lens) including first and second lenses G1 and G2 arranged in this order from an object. The first and second lenses G1 and G2 are made of first and second fluid materials 41 and 42 (FIGS. 2A and 2B) having different refractive indices from each other, respectively, and have a cemented surface (an interface between the first and second lenses G1 and G2) which has a variable shape, as described below. The first and second lenses G1 and G2 have a power as a whole. A front surface and a rear surface of the first and second lenses G1 and G2, ie., a surface closer to an object of the first lens GI and a surface closer to an image of the second lens G2, have a radius of curvature. Note that any one of them may be in the shape of a plane. A more detailed structure of the focusing section 10 and the principle of control of the cemented surface of the cemented lens will be described below with reference to FIGS. 2A and 2B.

The fixed lens group 20 has a third lens 63, a fourth lens G4, and a fifth lens G5 arranged in this order from an object. An aperture St is, for example, provided on an object side of the third lens 63. The third and fourth lenses G3 and G4 are cemented together. The third lens G3 is, for example, a biconcave lens, and the fourth lens G4 is, for example, a biconvex lens. The fifth lens G5 includes, for example, an aspherical lens, and at least a shape thereof at a center of the optical axis is in the shape of meniscus whose convex surface faces an object The aspherical shape of the fifth lens G5 is, for example, such that, within the range of an effective diameter, the object-side surface has a negative power which becomes stronger toward the surface periphery, and the image-side surface has a positive power which becomes stronger toward the surface periphery.

Figure 2A:
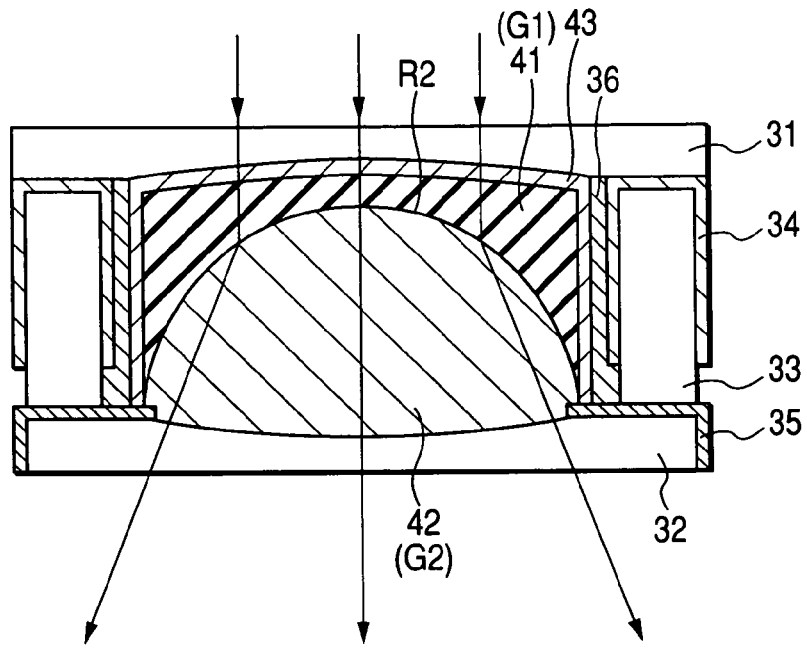
FIGS. 2A and 2B are structural diagrams illustrating an exemplary example of a focusing section.
Figure 2B:
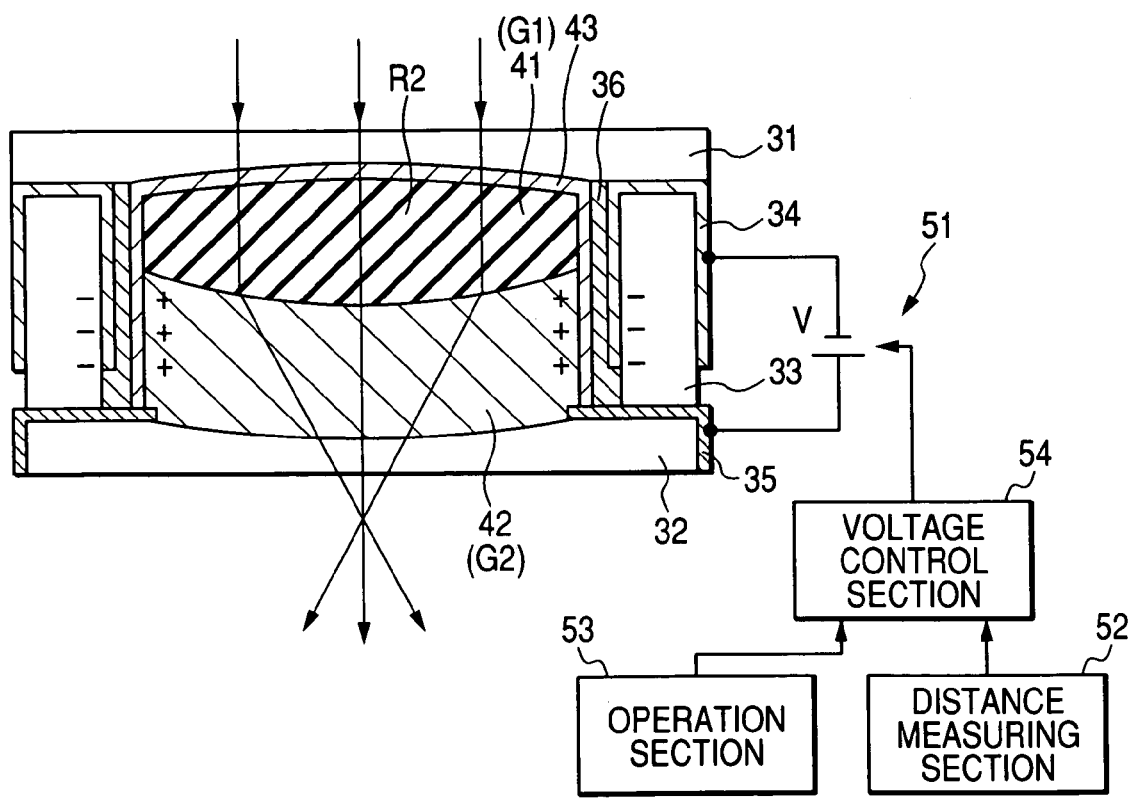

Note that the imaging optical system of the embodiment of the present invention is mainly characterized by the structure of the focusing section 10, and the fixed lens group 20 may have various structures, but not limited to the illustrated structure. The focusing section 10 may be provided inside the lens system instead of being closest to an object, FIGS. 2A and 2B illustrate an exemplary structure of the focusing section 10. The focusing section 10 includes the first and second fluid materials 41 and 42 (lens materials) which are loaded in a cylindrical tube 33 made of, for example, a glass material. The opposite ends of the tube 33 are enclosed with transparent end caps 31 and 32 made of: for example, a glass material. The first and second fluid materials 41 and 42 have different refractive indices from each other and are immiscible with each other (no mixing occurs). The first fluid material 41 is, for example, a non-conductive oil, and the fluid material 42 is, for example, a conductive aqueous solution. Surfaces facing the first and second fluid materials 41 and 42 of the end caps 31 and 32 are in the shape of curved surface. As a result, the front and rear surfaces of the first and second fluid materials 41 and 42 (the first and second lens G1 and G2) are in the shape of curved surface.

Surfaces of the end cap 31 and the tube 32 which are in contact with the first and second fluid materials 41 and 42 are covered with a hydrophobic coating material 43. A first electrode 34 is formed via an insulator 36 on a side of the tube 33 on which the hydrophobic coating material 43 is applied. A second electrode 35 is formed in contact with an end portion of the hydrophobic coating material 43. The first and second electrodes 34 and 35 are extended outside the focusing section 10 and are connected to a voltage applying section 51 (FIG. 2B) so that a voltage can be externally applied to the first and second electrodes 34 and 35.

FIG. 2A illustrates an ordinary state in which a voltage is not applied. Due to covering with the hydrophobic coating material 43, the second fluid material 42 becomes stable in the shape of a hemisphere inside the tube 33. On the other hand, FIG. 2B illustrates a state in which a voltage is applied. As illustrated in FIG. 2B, by applying a voltage V, charges are accumulated in a vicinity of interface between the conductive second fluid material 42 and the hydrophobic coating material 43 in contact therewith. The force of static electricity generated by the charges weakens interfacial tension which is caused by the hydrophobic coating material 43, thereby weakening hydrophobicity. As a result, the shapes of the first and second fluid materials 41 and 42 are changed. The degree of the shape change can be adjusted by regulating the magnitude of the voltage V applied by the voltage applying section 51. Specifically, the cemented surface (the interface between the conductive second fluid material 42 and the hydrophobic coating material 43) is changed from a convex state toward an object (FIG. 2A) to a planar state and a concave state (FIG. 2B) as the voltage V is increased. More specifically, the shape of the first fluid material 41 is changed from a concave lens to a planar lens and a convex lens while the shape of the second fluid material 42 is changed from a convex lens to a planar lens and a concave lens.

The focusing section 10 has a voltage control section 54 for controlling the voltage V applied by the voltage applying section 51. For example, the voltage control section 54 previously stores a relationship between the cemented surface shape of the cemented lens including the first and second fluid materials 41 and 42 and a distance from an object to the cemented lens, and controls the magnitude of the applied voltage V, depending on a distance from an object, thereby controlling the cemented surface shape. The voltage control section 54 controls the voltage V, depending on the structure of a camera in which the imaging optical system is incorporated. For example, when the camera has a distance measuring section 52, the voltage control section 54 controls the applied voltage V based on distance information measured by the distance measuring section 52. Thereby, an autofocus function can be achieved. Alternatively, a focus operation may be performed based on distance information input via an operation section 53 by the user. Here, the voltage applying section 51 and the voltage control section 54 correspond to a specific example of "control means" of the present invention.

In the embodiment of the present invention, in order to achieve efficient focusing, a refractive index Nd1 to a d line of the first fluid material 41 and a refractive index Nd2 to a d line of the second fluid material 42 satisfy conditions described below. Note that conditional expression (1) defines an appropriate numerical value range of a difference in refractive index between the first and second fluid materials 41 and 42, though the upper limit is not particularly limited in terms of focusing performance. In fact, the upper limit is specified by a lens material which is available as the first and second fluid materials 41 and 42. In the case of currently available lens materials, the upper limit is considered to be about 0.5.

$$0.1 < |Nd1 - Nd2| < 0.5 \quad (1)$$

The imaging optical system is also constructed, satisfying conditional expressions below. RA indicates a minimum value in use of a radius of curvature of the cemented surface (surface R2) of the cemented lens (the first and second lenses G1 and G2) including the first and second fluid materials 41 and 42. f indicates a focal length of the whole lens system fa indicates a focal length of the whole cemented lens.

$$3 < |RA|/f < 20 \quad (2)$$

$$|fa/f| > 1.0 \quad (3)$$

Also in the imaging optical system, an infrared cut coat may be applied on at least one of the front and rear surfaces (surfaces R1 and R3) of the first and second lenses G1 and G2. For example, this can be achieved by applying an infrared cut coat on the end caps 31 and 32.

Next, a function and an effect of the imaging optical system thus constructed will be described.

In the focusing section 10 of the imaging optical system, the first and second lenses G1 and G2 are made of the first and second fluid materials 41 and 42 (lens materials). Therefore, the cemented surface shape is electrically controlled. Specifically, as illustrated in FIG. 23, the voltage V applied by the voltage applying section 51 is controlled by the voltage control section 54 so that the cemented surface shape (the radius of curvature R2) is controlled. For example, in the case of the camera having the distance measuring section 52, the voltage control section 54 controls the applied voltage V, depending on distance information measured by the distance measuring section 52, thereby controlling the radius of curvature R2 of the cemented surface. As a result, an autofocus function is achieved. Thus, in the focusing section 10, focusing is achieved by controlling the shape of the cemented surface of the cemented lens (the first and second lenses G1 and G2), depending on a distance from an object. Since focusing is achieved without mechanically moving a lens using a motor or the like, it is advantageous in terms of ease of miniaturization and configuration. In addition, as the fixed lens group 20, an existing lens structure which remains fixed during focusing can be employed.

In the focusing section 10, efficient focusing can be made possible by the refractive indices Nd1 and Nd2 of the first and second fluid materials 41 and 42 5 constituting the cemented lens satisfying conditional expression (1). Conditional expression (1) defines an appropriate difference in refractive index between the first and second fluid materials 41 and 42. If the refractive index difference is smaller than the numerical range of conditional expression (1), a change in back focus becomes small with respect to a change in the radius of curvature R2 of the cemented surface, so that focusing is not efficiently performed.

Conditional expression (2) defines the ratio of the minimum value RA of the absolute value of the radius of curvature R2 of the cemented surface to the focal length f of the whole lens system. If the ratio is smaller than the lower limit of conditional expression (2), the effect of focusing with respect the RA value becomes excessively small, which is not preferable. If the ratio is larger than the upper limit, the effect of focusing with respect the RA value becomes excessively large, which is not preferable. Conditional expression (3) defines the ratio of the focal length fa of the whole cemented lens to the focal length f of the whole lens system in the focusing section 10. If the ratio is smaller than the lower limit of conditional expression (3), the power of the whole cemented lens becomes excessively large. In this case, the sensitivity of a change in power with respect to the profile irregularity of the front and rear surfaces (R1 and R3) of the cemented lens becomes high, resulting in difficulty in manufacture.

When an infrared cut coat is applied on one or both of the front and rear surfaces of the first and second lenses G1 and G2, the focusing section 10 can be caused to play a role as an infrared cut filter.

Thus, according to the imaging optical system of the embodiment of the present invention, focusing can be efficiently performed without mechanically moving a lens using a motor or the like, and an optical system suitable for miniaturization can be achieved.

EXAMPLES

Next, specific numerical value examples of the imaging optical system of the embodiment of the present invention will be described. FIGS. 3A and 3B illustrate specific lens data corresponding to the structure of the imaging optical system of FIG. 1. FIG. 3A illustrates a basic data portion of the lens data FIG. 3B illustrates a data portion concerning an aspherical shape of the lens data.

In the lens data, a column for surface numbers Si indicates the number of an i-th (i=1 to 10) lens element surface, where a lens element surface closest to an object is the first lens element surface, and i is successively increased toward an image. A column for radii of curvature Ri indicates the value of the radius of curvature of the i-th surface counted from an object, corresponding to reference character Ri of FIG. 1. A column Di for surface intervals indicates an interval on an optical axis between the i-th surface Si and the i+1-th surface Si+1 counted from an object. The radius of curvature Ri and the surface interval Di are indicated in units of millimeter (mm). Columns for Ndj and vdj respectively indicate the refractive index to a d line (587.6 nm) and the Abbe number of the j-th (j=1 to 6) lens element counted from an object, including the cover glass GC.

The radius of curvature R2 of the cemented surface S2 of the first and second lenses G1 and G2 constituting the focusing section 10 can vary with the range of 30.0 mm (minimum value RA) to ∞ (plane), depending on a distance from an object. The distances D1 and D2 indicate values when the radius of curvature R2 is 30.0 mm In the lens data of FIG. 3A, a symbol "*" attached to the left side of a surface number indicates that the lens surface has an aspherical shape. Both surfaces S7 and S8 of the fifth lens G5 of the fixed lens group 20 have an aspherical shape. The basic lens data illustrates numerical values of the radii of curvature in a vicinity of the optical axis (paraxial vicinity) as the radii of curvature of these aspherical surfaces. As can be seen from the data, the fifth lens G5 is in the shape of meniscus in the paraxial vicinity. Concerning the numerical values of the aspherical surface data of FIG. 3B, a symbol "EE" indicates that a numerical value following the symbol "E" is an "exponent" in base 10, and a, numerical value represented by the exponential function in base 10 is multiplied by a numerical value preceding "E". For example, "1.0E-02" indicates "1.0×10$^{-2}$".

The aspherical surface data illustrates coefficient values $A_i$ and K in an aspherical shape expression represented by expression (A) below. More specifically, Z indicates the length (mm) of a perpendicular from a point which is located at a height of h from the optical axis and on a certain aspherical surface, to a tangent plane (a plane perpendicular to the optical axis) of a vertex of the aspherical surface.

$$Z=C \cdot h^2/\{1+(1-K \cdot C^2 \cdot h^2)^{1/2}\}+A_3 \cdot h^3+A_4 \cdot h^4+A_5 \cdot h^5+A_6 \cdot h^6+A_7 \cdot h^7+A_8 \cdot h^8+A_9 \cdot h^9+A_{10} \cdot h^{10} \quad (A)$$

Z: a depth of the aspherical surface (mm)
h: a distance (height) from the optical axis to the lens surface
K: an eccentricity
C: a paraxial curvature=1/R
(R: a paraxial radius of curvature)
$A_i$: an i-th (1=3 to 10) aspherical surface coefficient FIG. 4A illustrates a relationship between a distance from an object and the radius of curvature R2 of the first and second lenses G1 and G2 as data concerning focusing. When the radius of curvature R2 is ∞, an object at an infinite distance is brought into focus. When the radius of curvature R2 is the maximum value of 30.0 mm, an object at a short distance (240 mm) is brought into focus. Note that, in this case, a change amount of back focus is 0.16 mm. FIG. 4A also simultaneously illustrates a paraxial focal length f(mm) of the fixed lens group 20, an F number (FNO.), and an angle of view 2ω (ω: half an angle of view), FIG. 4B illustrates a summary of values concerning the above-described conditional expressions (1) to (3) of the examples of the present invention. As illustrated in FIG. 4B, the values of the examples of the present invention fall within the numerical value ranges of conditional expressions (1) to (3).

Figure 5A:
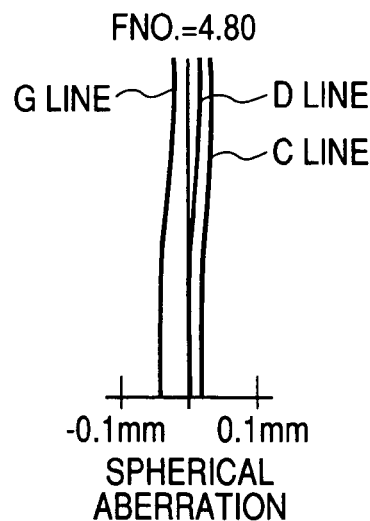
FIGS. 5A to 5C are aberration diagrams illustrating spherical aberration, astigmatism, and distortion when an object at an infinite distance is brought into focus in an imaging optical system according to an example of the present invention.
Figure 5B:
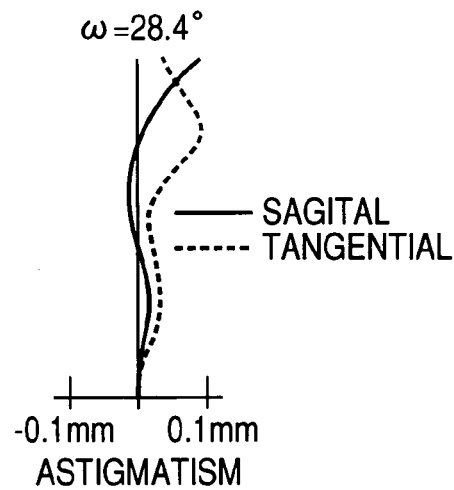
Figure 5C:
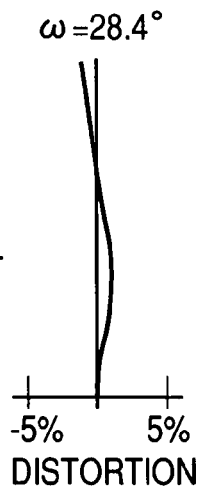
Figure 6A:
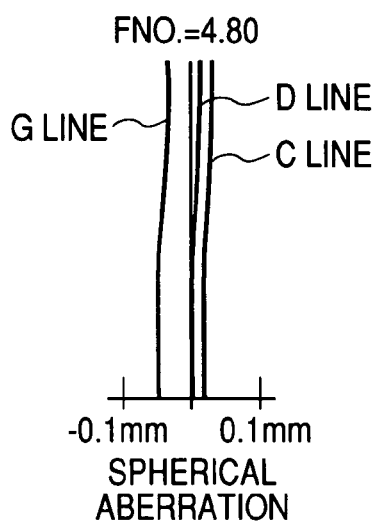
FIGS. 6A to 6C are aberration diagrams illustrating spherical aberration, astigmatism, and distortion when an object at a short distance is brought into focus in an imaging optical system according to an example of the present invention.
Figure 6B:
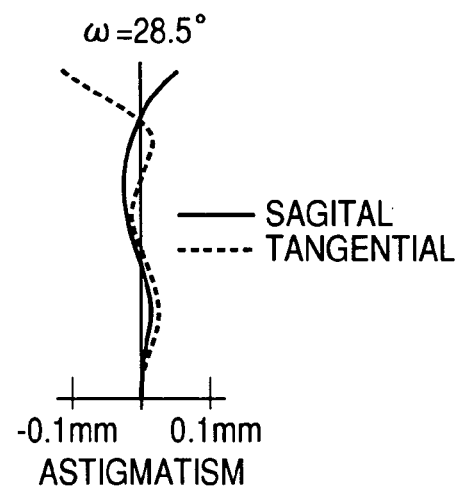
Figure 6C:
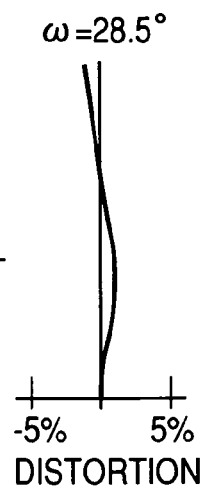

FIGS. 5A to 5C illustrate spherical aberration, astigmatism, and distortion (distortion aberration) when an object at an infinite distance is brought into focus (R2=∞). FIGS. 6A and 6C illustrate similar aberrations when an object at a short distance is brought into focus (R2=30.0 mm). Each aberration diagram illustrates aberrations using a d line as a reference wavelength. The spherical aberration diagram and the lateral chromatic aberration diagram also illustrate aberrations of a g line (wavelength: 435.8 nm) and a C line (wavelength: 656.8 nm). In the astigmatism diagram a solid line indicates aberration in a sagittal direction, and a dashed line indicates aberration in a tangential direction. ω indicates half an angle of view.

As can be seen from the above described numerical value data and aberration diagrams, a compact lens system in which aberration is satisfactorily corrected over a range from an infinite distance to a short distance is achieved.

Note that the present invention is not limited to the above-described embodiments and examples, and can be changed or modified in various ways. For example, the values of the radius of curvature, the surface interval, and the refractive index of each lens component are not limited to those illustrated in the above-described numerical value examples, and may be any other values.

While the invention has been described in detail and with reference to specific embodiments thereof it will be apparent to one skilled in the art that various changes and modifications can be made therein without departing from the spirit and scope thereof.

The present application claims foreign priority based on Japanese Patent Application No. JP2004-318349 filed Nov. 1 of 2004, the contents of which is incorporated herein by reference

What is claimed is:

1. An imaging optical system having a focus function, which comprises a lens system, the lens system comprising:
   a lens group remaining fixed during focusing;
   a focusing cemented lens including a first fluid material and a second fluid material as lens materials in this order from an object, wherein the first and second fluid materials have different refractive indices, and a shape of an interface between the first and second fluid materials is variable; and
   a control unit that electrically controls the shape of the interface between the first and second fluid materials, depending on a distance from the object,
   wherein the focusing cemented lens has a power as a whole and satisfies conditions (1) to (3) over an entire focusing region:

$0.1<|Nd1-Nd2|<0.5$ (1)

$3<|RA|/f<20$ (2)

$|fa/f|>1.0$, and, (3)

wherein
   Nd1 represents a refractive index to a d line of the first fluid material,
   Nd2 represents a refractive index to a d line of the second fluid material,
   RA represents a minimum value in use of a radius of curvature of the interface between the first and second fluid materials,
   fa represents a focal length of the focusing cemented lens, and
   f represents a focal length of the lens system.

* * * * *